May 28, 1946. P. T. SIMMONS 2,400,958
VISOR
Filed July 28, 1944
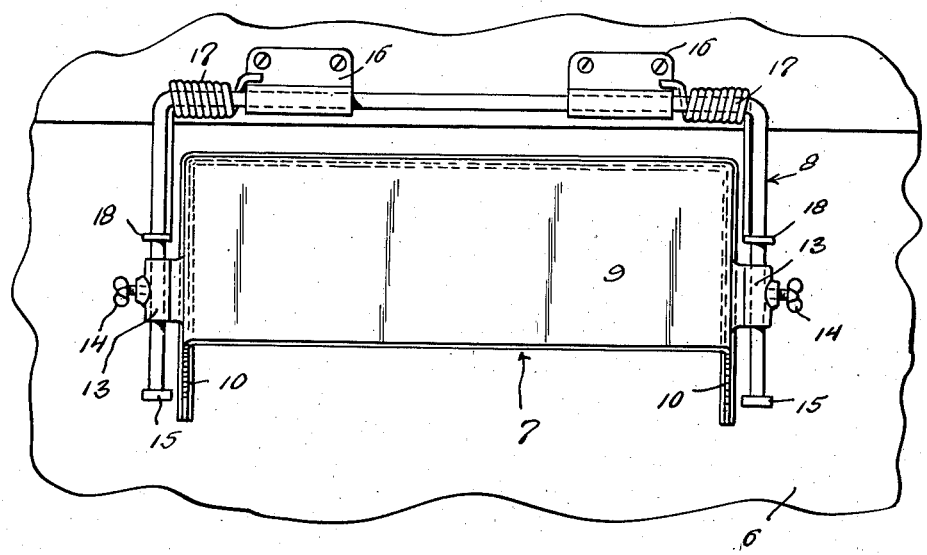
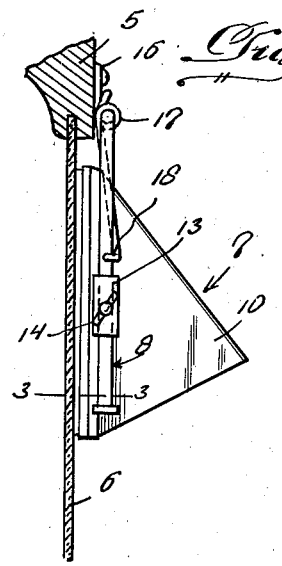
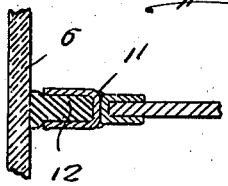
Inventor
Parker T. Simmons,
Attorneys Patented May 28, 1946

2,400,958

UNITED STATES PATENT OFFICE 2,400,958

VISOR

Parker T. Simmons, San Francisco, Calif.

Application July 28, 1944, Serial No. 546,951

1 Claim. (Cl. 296—97)

This invention relates to a visor for windshields used on various kinds of vehicles and the primary object of the invention, is the provision of a device of this character which will be extremely simple to install on a windshield to prevent weather elements, such as rain, snow, sleet and the like from contacting and interfering with the driver's seeing through that portion of the glass of the windshield within the driver's range of vision and also to act as an anti-glare shield for the eyes of the driver against headlight glare of approaching vehicle lights or other lights that may interfere with the driver's vision.

With these and other objects in view as will become more apparent as the description proceeds, the invention consists of certain novel features of construction, combination and arrangement of parts as will be hereinafter more fully described and claimed.

For a complete understanding of my invention, reference is to be had to the following description and accompanying drawing, in which Figure 1 is a front elevation illustrating a visor applied to a fragmentary portion of a windshield of a vehicle and constructed in accordance with my invention, Figure 2 is a fragmentary transverse sectional view showing the visor contacting the glass of the windshield, Figure 3 is a detailed sectional view taken on the line 3—3 of Figure 2.

Referring in detail to the drawing the numeral 5 indicates a fragmentary portion of a windshield of any type of vehicle and 6 the glass panel of the windshield. It is a well known fact that when rain, sleet or the like contacts the glass panel 6 it is very difficult for the driver of the vehicle to see and to obviate this, the present invention is installed on the windsheld so as to protect that portion of the glass that is directly in front of the driver or within his range of vision from the vehicle in a forwardly direction. The invention consists primarily in a visor 7 and a supporting means 8 therefor.

The visor 7 is constructed of any material suitable for the purpose and preferably of a material that is capable of diffusing the light rays and includes a sloping front wall 9 and end walls 10 all of integral construction and applied to the rear edges of the front wall and end walls is a double channeled member 11, one channel of which frictionally grips said walls of the visor while the other channel thereof has imbedded therein and protruding therefrom a cushion strip 12 to contact the glass panel 6 of the windshield and thereby establish a seal between the visor and the glass panel of said windshield.

The end walls 10 have formed thereon sleeves 13 equipped with set screws 14. The sleeves are slidably mounted on the supporting means 8 and is held in adjusted positions by the set screws 14.

The mounting 8 is in the form of a substantially U-shaped frame, the parallel arms thereof extending through the sleeve 13 with the ends enlarged as at 15. The connecting portion of the substantially U-shaped frame is journaled in brackets 16 secured on the frame 5 of the windshield by screws or like fasteners. The frame of the mounting is capable of swinging upwardly and downwardly in the brackets 16. Tension springs 17 including coil portions are wound on the frame with ends thereof bearing against the brackets while other ends are in the form of hooks 18 engageable with the arm portions of the frame. The tension means urges the frame in a position that brings the packing strip 12 of the visor in tight contact with the glass panel of the windshield. However, the visor may be manually swung upwardly any time it is desired to clean or otherwise treat the glass directly behind the visor. After the installation of the invention on a windshield as shown in Figures 1 and 2 of the drawing, the visor element 7 may be adjusted vertically by releasing the set screws 14 to bring the lower edge of the front sloping wall 9 substantially in normal line of vision of the driver or operator of the vehicle so that the driver may see through the front wall 9 or under the latter whenever desired. To the driver when looking through the front wall, the latter then will act as anti-glare device for diffusing the light rays of approaching lights. Normally the operator or driver will view the roadway from under the lower edge of the front wall. The glass panel of the windshield directly behind the visor element will be kept free of rain, snow or sleet so that the vision of the driver will be unobstructed thereby.

While I have shown and described the preferred embodiment of my invention, it will be understood that minor changes in construction, combination and arrangement of parts may be made without departing from the spirit and scope of the invention as claimed.

Having thus described my invention, what I claim is:

In a visor for a windshield, a visor element of light diffusing material and including a sloping front wall and end walls of integral construction, a double channeled member having the channels thereof oppositely disposed with the rear edges of said end walls and said front wall engaged in one of said channels, a cushion strip embedded in the opposite channel of said channeled member adapted to contact and seal the visor element with the glass of the windshield, sleeves on said visor element, a substantially U-shaped frame for said visor element including a connecting portion with the parallel arms thereof extending through said sleeves, set screws carried by the sleeves for engaging the parallel arms, brackets rotatably receiving the connecting portion of said U-shaped frame and secured to a windshield, and tension means engaging the frame and the brackets for urging the visor element towards the glass of the windshield.

PARKER T. SIMMONS.